US010223506B2

(12) United States Patent
Holt

(10) Patent No.: US 10,223,506 B2
(45) Date of Patent: Mar. 5, 2019

(54) SELF-DESTRUCTING FILES IN AN OBJECT STORAGE SYSTEM

(75) Inventor: Gregory Holt, Hollywood Park, TX (US)

(73) Assignee: Rackspace US, Inc., San Antonio, TX (US)

( * ) Notice: Subject to any disclaimer, the term of this patent is extended or adjusted under 35 U.S.C. 154(b) by 427 days.

(21) Appl. No.: 13/439,322

(22) Filed: Apr. 4, 2012

(65) Prior Publication Data

US 2013/0268740 A1 Oct. 10, 2013

(51) Int. Cl.
G06F 21/00 (2013.01)
G06F 12/14 (2006.01)
G06F 21/62 (2013.01)

(52) U.S. Cl.
CPC .......... G06F 21/00 (2013.01); G06F 21/6272 (2013.01); G06F 2221/2143 (2013.01)

(58) Field of Classification Search
CPC ................ G06F 21/00; G06F 21/6272; G06F 2221/2143
USPC ........ 711/163; 707/662, 663, 664, 781, 782, 707/783
See application file for complete search history.

(56) References Cited

U.S. PATENT DOCUMENTS

| | | | |
|---|---|---|---|
| 7,350,041 B1* | 3/2008 | Armangau et al. | 711/162 |
| 8,204,227 B2* | 6/2012 | Itoh | G06F 21/6209 380/277 |
| 2005/0097260 A1* | 5/2005 | McGovern et al. | 711/100 |
| 2006/0026220 A1* | 2/2006 | Margolus | 707/204 |
| 2006/0123232 A1* | 6/2006 | Cannon | G06F 3/0623 713/165 |
| 2007/0100950 A1* | 5/2007 | Bornstein et al. | 709/206 |
| 2008/0034003 A1* | 2/2008 | Stakutis et al. | 707/200 |
| 2010/0306175 A1* | 12/2010 | Johnson et al. | 707/663 |
| 2012/0254825 A1* | 10/2012 | Sharma et al. | 717/101 |
| 2013/0013652 A1* | 1/2013 | Gupta et al. | 707/812 |
| 2013/0080726 A1* | 3/2013 | Kegel | G06F 12/1081 711/163 |

* cited by examiner

Primary Examiner — Reginald G Bragdon
Assistant Examiner — Mehdi Namazi
(74) Attorney, Agent, or Firm — Haynes and Boone, LLP

(57) ABSTRACT

An object storage system providing a secure object destruction and deletion service is provided. The destruction and deletion of files can be handled through secure overwriting of files on a storage medium or through cryptographic scrambling of file contents followed by subsequent deletion from a file table. The triggering of secure deletion can be periodically scheduled or dependent upon some particular event, making files self-destructing. Methods and systems for periodic re-authorization of files are also provided, allowing self-destructing files to be persisted in an available state.

18 Claims, 8 Drawing Sheets

SELF-DESTRUCTING FILES IN AN OBJECT STORAGE SYSTEM

The present application claims benefit of U.S. provisional patent application 61/450,166, filed Mar. 8, 2011, entitled "Massively Scalable File Storage System." This application is also related to co-pending non-provisional U.S. patent applications Ser. No. 13/089,442, filed April 19, 2011, Ser. No. 13/089,476, filed Apr. 19, 2011, Ser. No. 13/089,487, filed Apr. 19, 2011, and Ser. No. 13/089,510, filed Apr. 19, 2011. The entirety of these disclosures is hereby incorporated by reference.

BACKGROUND

The present disclosure relates generally to cloud computing, and more particularly to a massively scalable object storage system to provide storage for a cloud computing environment, particularly with regard to the storage and modification of large files.

Cloud computing is a relatively new technology but it enables elasticity or the ability to dynamically adjust compute capacity. The compute capacity can be increased or decreased by adjusting the number of processing units (cores) allocated to a given instance of a processing module (server or node) or by adjusting the overall quantity of processing modules in a system. Cloud computing systems such as OpenStack abstract the management layer of a cloud and allow clients to implement hypervisor agnostic processing modules.

As the use of cloud computing has grown, cloud service providers such as Rackspace Hosting Inc. of San Antonio, Tex., have been confronted with the need to greatly expand file storage capabilities rapidly while making such expansions seamless to their users. Conventional file storage systems and methods to expand such systems suffer from several limitations that can jeopardize data stored in the object storage system. In addition, known techniques use up substantial resources of the object storage system to accomplish expansion while also ensuring data safety. Finally, the centralization of data storage brings with it issues of scale. A typical local storage system (such as the hard drive in a computer) may store thousands or millions of individual files for a single user. A cloud-computing-based storage system is designed to address the needs of thousands or millions of different users simultaneously, with corresponding increases in the number of files stored.

An increasingly common use of cloud computing is computations on so-called "big data"—datasets that are much larger than memory and are frequently much larger than the available disk space on any particular computer. Current datasets can be so large that they become difficult to store and process, and the storage and processing of large datasets is only set to increase over time. Depending on the type of data, this may involve datasets that are terabytes, exabytes or zettabytes in size. Adding to the complication, efficient dataset processing may require random (as opposed to sequential) access. Applications of large dataset processing include meteorology, genomics, economics, physics, biological and environmental research, Internet search, finance, business informatics, and sociological analysis. Information technology and security organizations also may generate extensive activity logs requiring massive amounts of storage.

One of the side-effects of cloud computing-based storage is an emphasis on end-user privacy. To the extent that end users are storing sensitive data offsite and in the control of another party, better methods of maintaining privacy and security are needed. Further, it is necessary or useful to include functionality to automatically handle secure file deletion and destruction without requiring manual intervention by either the end user or the cloud computing provider.

Accordingly, it is desirable to provide an improved scalable object storage system with support for self-deleting files.

SUMMARY

An object storage system providing a secure object destruction and deletion service is provided. The destruction and deletion of files can be handled through secure overwriting of files on a storage medium or through cryptographic scrambling of file contents followed by subsequent deletion from a file table. The triggering of secure deletion can be periodically scheduled or dependent upon some particular event, making files self-destructing. Methods and systems for periodic re-authorization of files are also provided, allowing self-destructing files to be persisted in an available state.

The specifics of these embodiments as well as other embodiments are described with particularity below.

BRIEF DESCRIPTION OF THE DRAWINGS

FIG. 1b is a schematic view illustrating an embodiment of an information handling system used in the file storage system of FIG. 1a.

FIG. 2 is a schematic view illustrating an embodiment of a logical structure provided by the file storage system of FIG. 1a.

DETAILED DESCRIPTION

Figure 1A:
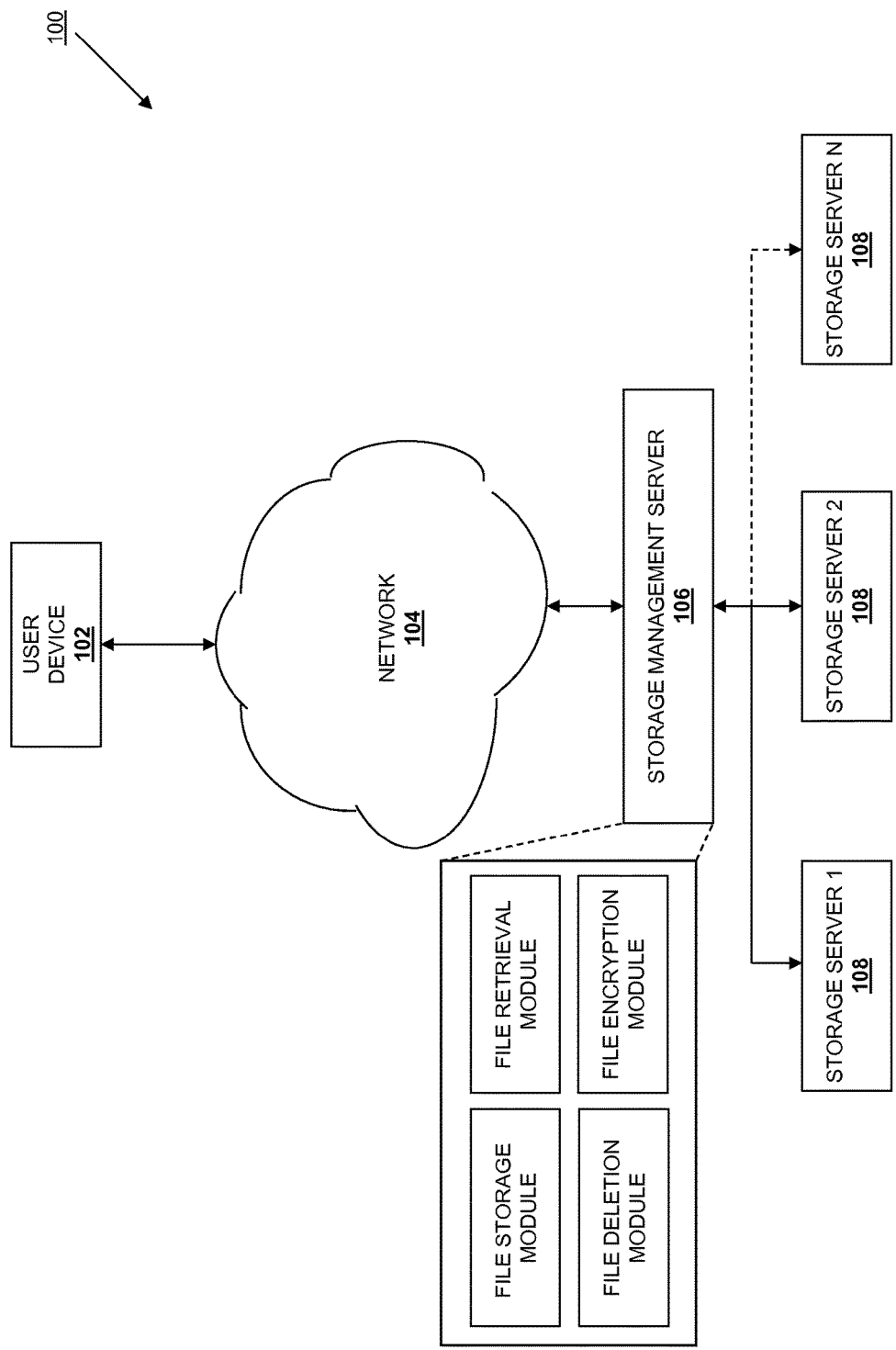
FIG. 1a is a schematic view illustrating an embodiment of a file storage system.

Referring now to FIG. 1a, an embodiment of a file storage system 100 is illustrated. The file storage system 100 includes a user device 102 connected to a network 104 such as, for example, a Transport Control Protocol/Internet Protocol (TCP/IP) network (e.g., the Internet.) A storage management server 106 is connected to the network 104 and to a plurality of storage servers 108. While only one user device has been illustrated as connected to the network 104 for clarity of discussion, one of skill in the art will recognize that a plurality of user devices may, and typically will, be connected to the network 104. While only one storage management server coupled to a plurality of storage servers has been illustrated as connected to the network 104 for clarity of discussion, one of skill in the art will recognize that a plurality of storage management servers, each connected to a plurality of storage servers may, and typically will, be connected to the network 104. Each of the user device 102 and the storage management server 106 includes a respective network interface for communicating with the network 104 (e.g., outputting information to, and receiving information from, the network 104).

Each of the user device 102, storage management server 106, and the plurality of storage servers 108 may include a respective information processing system, a subsystem, or a part of a subsystem for executing processes and performing operations (e.g., processing or communicating information). An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems know in the art.

Figure 1B:
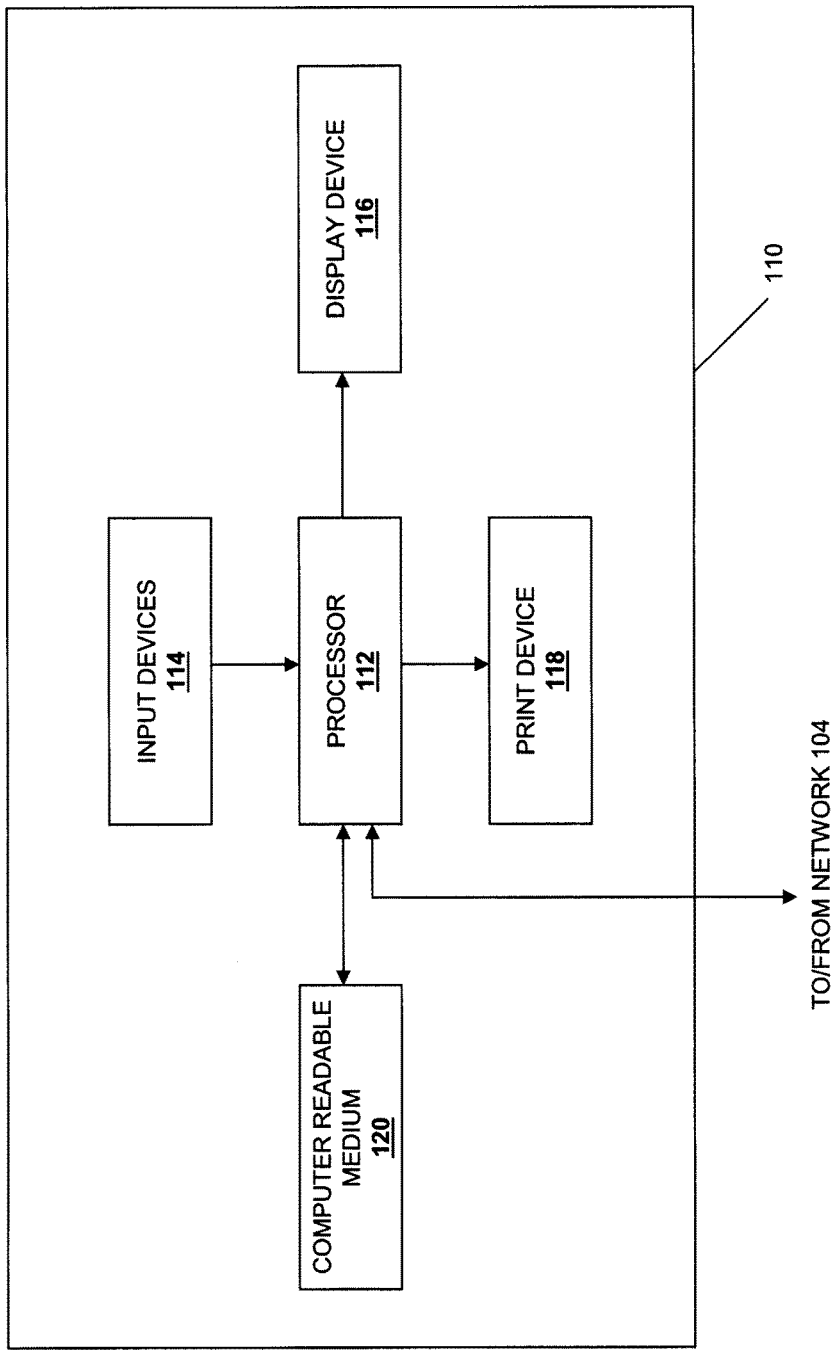

Referring now to FIG. 1b, an information processing system 110 which is representative of one of, or a portion of, the information processing systems described above, is illustrated. The information processing system 110 may include any or all of the following: (a) a processor 112 for executing and otherwise processing instructions, (b) a plurality of input devices 114, which are operably coupled to the processor 112, for inputting information, (c) an optional display device 116, which is operably coupled to the processor 112, for displaying information, (d) an optional print device 118, which is operably coupled to the processor 112, for printing visual images, scanning visual images, and/or faxing visual images, (e) a computer-readable medium 120, which is operably coupled to the processor 112, for storing information, as discussed further below, and (f) various other electronic circuitry for performing other operations of the information processing system 110 known in the art. For example, the information processing system 110 may include (a) a network interface (e.g., circuitry) for communicating between the processor 110 and the network 104 and/or other devices, and (b) a memory device (e.g., FLASH memory, a random access memory (RAM) device or a read-only memory (ROM) device for storing information (e.g., instructions executed by processor 112 and data operated upon by processor 112 in response to such instructions)).

The computer-readable medium 120 and the processor 110 are structurally and functionally interrelated with one another as described below in further detail, and information processing system of the illustrative embodiment is structurally and functionally interrelated with a respective computer-readable medium similar to the manner in which the processor 112 is structurally and functionally interrelated with the computer-readable medium 120. As discussed above, the computer-readable medium 120 may include a hard disk drive, a memory device, and/or a variety of other computer-readable media known in the art, and when including functional descriptive material, data structures are created that define structural and functional interrelationships between such data structures and the computer-readable medium 120 (and other aspects of the system 100). Such interrelationships permit the data structures' functionality to be realized. For example, the processor 112 reads (e.g., accesses or copies) such functional descriptive material from the computer-readable medium 120 onto the memory device of the information processing system 110, and the information processing system 110 (more particularly, the processor 112) performs its operations, as described elsewhere herein, in response to such material stored in the memory device of the information processing system 110. In addition to reading such functional descriptive material from the computer-readable medium 120, the processor 112 is capable of reading such functional descriptive material from (or through) the network 104. In one embodiment, the computer-readable medium is non-transitory.

Figure 2:
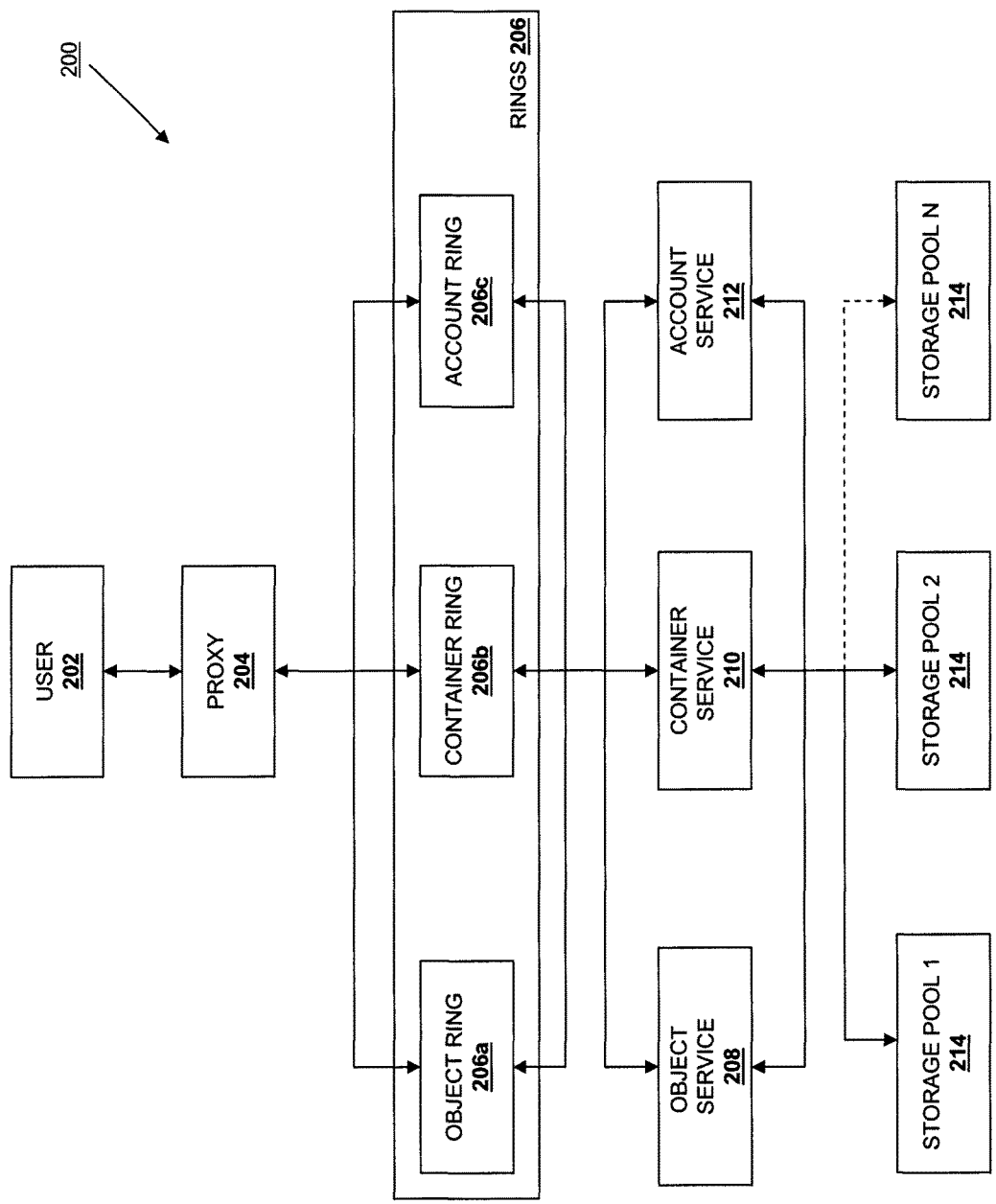

Referring now to FIGS. 1a and 2, the file storage system of FIGS. 1a and 1b creates a logical structure 200. The logical structure 200 includes a user 202 connected to a proxy 204. In one embodiment, the user 202 may be provided by the user device 102, the proxy 204 may be provided by the storage management server 106, and the user 202/proxy 204 connection may be created by the coupling of the user device 102 to the storage management server 106 through the network 104. The proxy 204 is connected to one or more rings 206 such as an object ring 206a, a container ring 206b, and an account ring 206c, described in further detail below, that are connected to an object service 208, container service 210, and an account service 212, respectively, described in further detail below. In other embodiments, there are other types of objects managed by rings, such as a structured data ring, a graph storage ring, or another type of ring (not pictured). In such embodiments, each ring would be connected to an appropriate service, such as a structured data service, a graph service, or another service (not pictured).

Each of object service 208, the container service 210, and the account service 212 are connected to a plurality of storage pools 214. In one embodiment, the rings 206 may include software that is stored on a computer-readable medium location in the storage management server 106 and/or the storage servers 108. In one embodiment, the object service 208, the container service 210, and the account service 212 may include software that is stored on a computer-readable medium located in the storage management server 106 and/or the storage servers 108. In one embodiment, the storage pools 214 may be provided by the storage servers 108. In one embodiment, the proxy 204/rings 206/object service 208/container service 210/account service 212/storage pool 214 connections may be created by the connection of the storage management server 106 with the storage servers 108. In a further embodiment, the rings are implemented at least in part using electrical circuits on a semiconductor chip to achieve better speed and latency.

In one embodiment, each storage pool 214 is provided by a separate storage server 108 or includes a virtual server that is included in a portion of one of the storage servers 108 or across a plurality of the storage servers 108. For example, the storage servers 108 may be physically located in one or more data centers, and the resources of the storage servers 108 may be virtualized according to the requirements of a plurality of users (e.g., the user 202) such that the plurality of storage pools 214 are provided to the plurality of users in order to store files and/or data objects. Thus, resources for a particular virtual server or storage pool may span across multiple storage servers 108.

Figure 3:
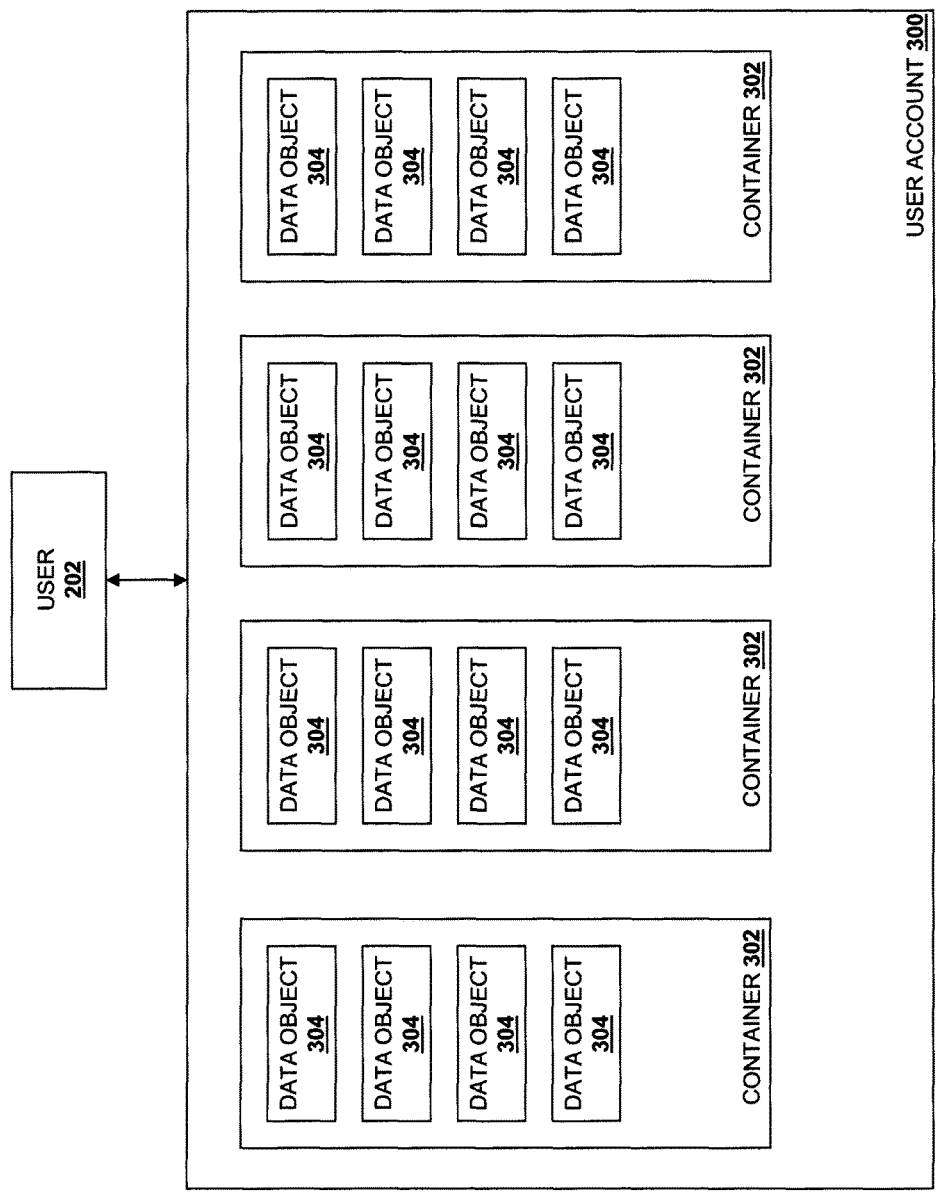
FIG. 3 is a schematic view illustrating an embodiment of a user account.

Referring now to FIG. 3, the user 202, which is exemplary of a plurality of users that use the file storage system 100, has a user account 300 with the file storage system 100 to store and receive data objects, and that user 202 may create a plurality of containers 302 in the user account 300 and store a plurality of data objects 304 in each of the containers 302 for retrieval. In the discussion below, a user account is referred to as an "account", a container is referred to as a "container", and a data object us referred to as an "object" for clarity of discussion. One of skill in the art will recognize that the terms "account", "container" and "object" are generic forms of data naming that are used to direct the file storage system 100 to a specific data object. When other types of rings and services are used, an appropriate name may be substituted. For clarity, discussion of alternative rings and services will be limited to the "account", "container" and "object" rings and services.

The components of the file storage system 100 and some of their functions will now be described in detail.

The Rings 206

As discussed above, the rings 206 are implemented in a tailored electrical circuit or as software instructions to be used in conjunction with a processor to create a hardware-software combination that implements the specific functionality described herein. To the extent that software is used to implement the rings, it may include software that is stored on a computer-readable medium location in the storage management server 106 and/or the storage servers 108. Referring back to FIG. 2, the rings 206 include semiconductor circuits and/or computer-executable instructions that, when executed by a processor, provide subsystems of the file storage system 100 that provide a mapping between the entities stored in the file storage system 100 and the locations of those entities in the storage pools 214. In the illustrated embodiment, the file storage system 100 includes a separate object ring 206a, container ring 206b, and account ring 206c, and when components of the file storage system 100 need to perform any operation on an object, container, or account, those components interact with the object ring 206a, container ring 206b, and account ring 206c, respectively, to determine the location of that stored entity in the storage pools 214. However, one of skill in the art will recognize that different ring structures may be provided (e.g., a single ring for the objects, containers, and accounts, more than one ring for each of the objects, containers, and account, etc.) without departing from the scope of the present disclosure. The rings 206 maintain the availability and safety of data in the file storage system 100 through the use of zones, partitions, replicas, and the storage pools 214, as described below.

A zone is defined as one or more of the storage pools 214 that are subject to a correlated loss of access or data as a result of a particular event. For example, each storage server 108 in the file storage system 100 may be defined as a storage pool in a separate zone, as each storage server 108 is subject to loss of access to its stored objects as a result of a storage device failure, a catastrophic event at the location where the storage server resides, and/or a variety of other object access-loss scenarios known in the art. For the same reasons, a drive in a storage server 108 may be defined as a storage pool in a separate zone, a plurality of storage servers 108 in a given storage rack or cabinet as a storage pool in a separate zone, a plurality of storage servers 108 coupled to the same switch as a storage pool in a separate zone, a plurality of storage servers 108 in a given datacenter as a storage pool in a separate zone, a plurality of storage servers 108 connected to a common power system as a storage pool in a separate zone, etc. One of skill in the art will recognize that the examples of zones provided above are not limiting, and a variety of zones known in the art will fall into the scope of the present disclosure.

Logically, a partition is an abstract storage bucket. As discussed in further detail below, the file storage system 100 maps each partition to a plurality of storage pools 214 that are in different zones, and stores data using those partitions. The mapping of a given partition to a plurality of storage pools 214 creates a plurality of partition replicas of that partition (e.g., equal to the number of storage pools 214 the partition is mapped to.) For example, when a given partition is mapped to 3 storage pools 214 that are in different zones, 3 partition replicas of that partition are created.

The object ring 206a for the management of objects will be described in detail below. However, one of skill in the art will recognize how the discussion may be applied to the container ring 206b, the account ring 206c, and/or a ring for any other stored entity, without departing from the scope of the present disclosure.

In various replicated, network-based file storage systems, an object from a user is received by a proxy. To determine where the object should be stored, some attribute of the object or the object data itself is hashed. If necessary, some attribute of the object is modified so that three different results are returned from the hashing function. The object is then replicated and stored in the storage pool corresponding to the number returned by the hash function.

Under typical circumstances, a consistent hashing function is used as the hash function. The use of the consistent hashing function ensures that there will be minimal changes to the assigned storage pools given a change in membership due to adding or removing new storage pools.

Although the consistent hashing function results in minimal changes to the storage location, sometimes the assignments made by the consistent hashing function or the rearrangements needed due to a change in membership may have undesirable storage characteristics. For example, such methods have been found to result in multiple object replicas for the same object being stored in one or more storage pools that are in the same zone. As discussed above, this is undesirable because then multiple (and possibly all) object replicas for the same object are subject to being lost as a result of a particular event. Alternatively, rebalancing the replicas due to a change in membership has been found to require the movement to two of the replicas 4% of the time, and the movement of all three replicas 1% of the time. It is desirable to never have to move more than one replica at a time.

Figure 4:
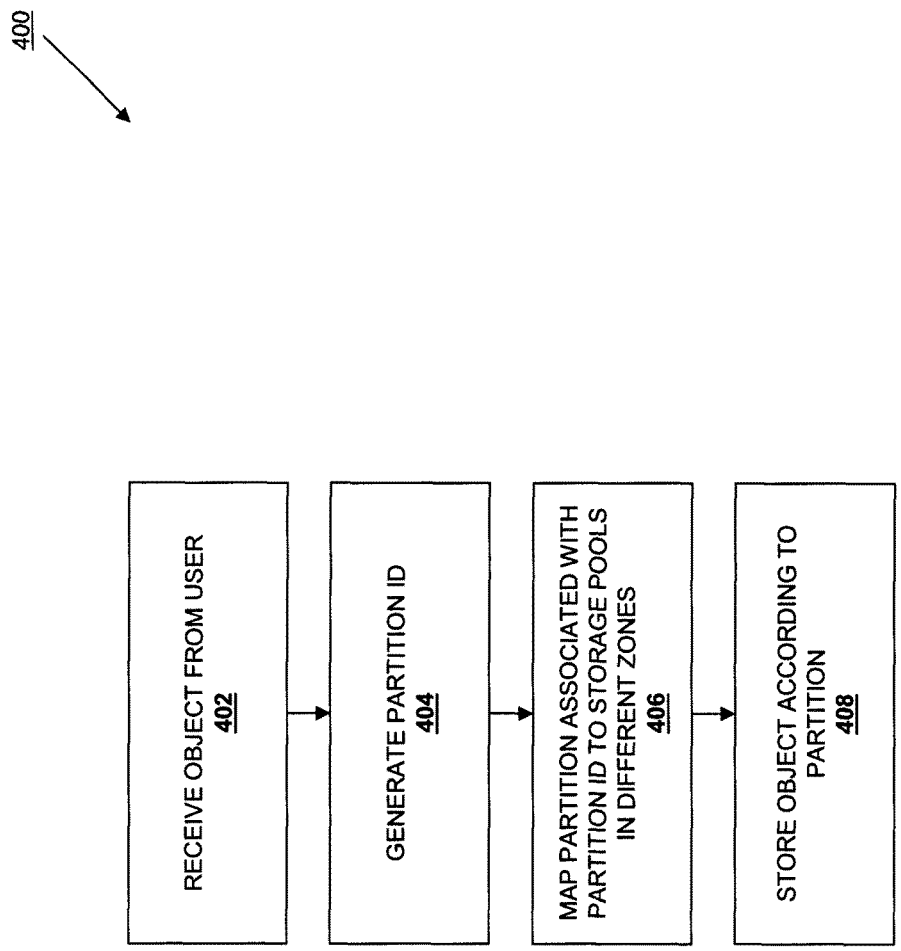
FIG. 4 is a flow chart illustrating a method for storing an object according to one embodiment.

In one embodiment, the file storage system 100 solves the problem of multiple object replicas for the same object being stored in storage pools that are in the same zone through the use of the rings 206. Referring now to FIG. 4, a method 400 for storing stored entities is illustrated. At block 402, an object is received by a user. In one embodiment, an object is received from the user 202 by the proxy 204. The method 400 then proceeds to block 404 where a partition identification is generated. In one embodiment, a consistent hash function is applied to the object received in block 402, and the hash function returns a partition identification that corresponds to a partition. The method 400 then proceeds to block 406 where the partition associated with the partition identification is mapped to storage pools that are in different zones. This mapping function is constrained so that the physical location of the storage pools is required to have one or more desirable properties, such as having each partition replica in a separate zone.

There are various embodiments of the constrained mapping function. In one embodiment, the constrained mapping function is the output of a constraint satisfaction solver, in which the desired storage characteristics (such as the requirement that each replica of a partition be in a different availability zone) are inputs to the solving function. The solver then uses one or more search methodologies within the solution space to find a storage layout that maps partitions to storage pools in a desirable manner.

In a second embodiment, a constrained mapping function is applied to portions of the partition identification (e.g., the portions of the partition identification that the constrained mapping function is applied to) may be bits of the output of the original hashing function is applied to the object. For example, the number of bits to which the constrained mapping function is applied may be known as the partition power, and 2 to the partition power may indicate the partition count. The constrained mapping function is designed to return a storage pool location for each portion of the partition identification to which it is applied, and the storage pool locations returned for a given partition identification will each correspond to storage pools 214 in different zones. These storage pool locations are then associated with the partition identification. Thus, the partition corresponding to the partition identification is replicated multiple times in the file storage system 100 (i.e., a partition replica is included in each storage pool corresponding to the storage pool locations determined from the constrained mapping function.) The method 400 then proceeds to block 408 where the object is stored according to the partition. The object received by the user 202 in block 402 of the method 400 may then be stored according to the partition corresponding to the partition identification, which results in multiple object replicas for the object being stored in storage pools that are in different zones in the file storage system 100. In another embodiment, the constrained mapping function is used to determined storage pool locations that are in different zones for each partition prior to the object being received by the user 202, discussed in further detail below.

The output of the constrained mapping function signifies a particular storage pool where a replica of the partition should be stored. An example of this output is as follows: When an object is received from the user 202 at block 402 of the method 400, and at block 404 of the method 400, a hash function is applied to the object. In one exemplary embodiment, the user 202 provides data including an account/container/object name to the proxy 2004, and a hash function is applied to the account/container/object name as follows:

Hash function (account/container/object name) =123456789

Where 123456789 is the partition identification that is returned by the hash function. At block 406 of the method 400, the partition mapping number may then be divided into 3 parts (e.g., the first three digits, the second three digits, and the third three digits of the partition identification,) and the constrained mapping function is applied to each of those parts:

Constrained mapping function (123)=storage pool location (zone 1)
Constrained mapping function (456)=storage pool location (zone 7)
Constrained mapping function (789)=storage pool location (zone 3)

As discussed above, the constrained mapping function is designed to return the storage pool location (zone 1), storage pool location (zone 7), and storage pool location (zone 3) that correspond to storage pools that are in different zones (e.g., zones 1, 3, and 7). The storage pools locations are then associated with the partition identification:

Partition identification: (storage pool location (zone 1)), storage pool location (zone 7), storage pool location (zone 3))

Thus, the partition corresponding to the partition identification is replicated across storage pools that are in different zones (here, zones 1, 3, and 7.) At block 408 of the method 400, the object received from the user 202 is then stored, using the partition corresponding to the partition identification, in each of the storage pools corresponding to the storage pool locations returned by the application of the constrained mapping function to portions of the partition identification. Thus, 3 replicas of the object received from the user 202 are stored in the file storage system 100 in storage pools that are located in different zones (zones 1, 3, and 7.) In one embodiment, each of the storage pool locations are IP addresses, i.e., when each of the storage pools are separate storage servers. In one embodiment, the constrained mapping function is a hash function. However, one of skill in the art will recognize that a variety of functions may be used to ensure that each partition is mapped to storage pools that are in different zones without departing from the scope of the present disclosure.

In another embodiment, the constrained mapping function is applied to the file storage system 100 before the object is received by the user 202 at block 402 in order to accomplish the mapping of the partitions to storage pools described above with reference to block 406 of the method 400. For example, the total number of partitions and the total number of storage servers/storage pools in the file storage system 100 may (and typically will) be known. With that knowledge, the constrained mapping function is used to map each partition in the file storage system 100 to a plurality of storage pools that are in different zones, and that information is stored in a constrained mapping database. For example, a constrained mapping database may include partitions mapped to storage pools such as:

Partition 1: (storage pool location (zone 1)), storage pool location (zone 2), storage pool location (zone 3))
Partition 2: (storage pool location (zone 4)), storage pool location (zone 5), storage pool location (zone 6))
Partition 3: (storage pool location (zone 7)), storage pool location (zone 8), storage pool location (zone 9))

In one embodiment, the output of the constrained mapping function can be saved for optimized lookup. For example, the saved output may be embodied in a file provided to each of the storage pools 214, or stored in a database that is available for the appropriate systems to query. If the saved output is contained within a file, the storage pools 214 may then periodically check the modification time of this file and reload their in-memory copies of the ring structure as needed.

Thus, when an object is received from a user 202 at block 402, the hash function is applied to that object to get the partition identification (e.g., partition 1, 2, or 3 in the example above) at block 404, and then at block 406, the partition identification may then be used with the constrained mapping database to determine the corresponding partition and its associated storage pool locations. This embodiment allows the processing necessary to map partitions to multiple storage pools in different zones to be conducted before objects are received from users so that such processing does not have to be conducted each time an object is received from a user.

Figure 5:
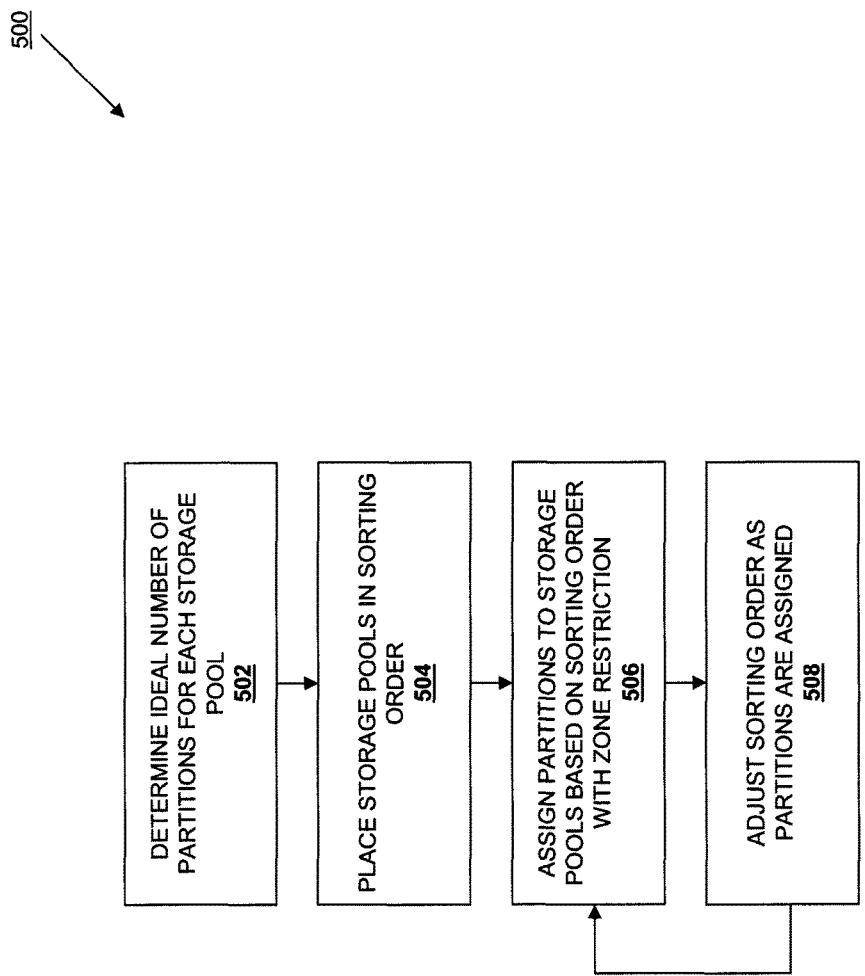
FIG. 5 is a flow chart illustrating a method for creating a ring according to one embodiment.

For example, referring now to FIG. 5, a method for building a ring 206 is illustrated. At block 502, an ideal number of partitions for each storage pool in the file storage system is determined. In one embodiment, the number of partitions that should ideally be assigned to each storage pool 214 is calculated based the weight (e.g., storage capacity) of each storage pool 214. For example, if the partition power is 20, the ring 206 will have 1,048,576 ($2^{20}$) partitions. If there are 1,000 storage pools 214 of equal weight, each storage pool 214 will ideally be assigned 1,048,576 partitions. This may be referred to as an ideal partition count, and in the example, each storage pool 214 starts off empty with a 1,048,576 ideal partition count. The method 500 then proceeds to block 504 where the storage pools are placed in a sorting order. In one embodiment, the storage pools 214 are placed in a sorting order based on their ideal partition count (e.g., highest to lowest), and this sorting order is maintained throughout the method 500 as partitions are assigned storage pools 214. The method 500 then proceeds to block 506 where partitions are assigned to storage pools based on their sorting order but with a zone restriction. In one embodiment, the partitions are assigned to the storage pool 214 with the highest ideal partition count, but subject to the restriction that the storage pool 214 to which a partition is being assigned is not in the same zone as any other storage pool 214 that includes a partition replica for that same partition. The method 500 then proceeds to block 508 where the sorting order of the storage pools is adjusted. In one embodiment, once a partition is assigned to a storage pool 214, that storage pool 214 will have its ideal partition count decremented and thus that storage pool 214 is moved to a lower position in the sorting order, and the method 500 then returns to block 506 to continue to assign partitions to storage pools based on their sorting order but with the zone restriction. In such a manner, each partition is assigned multiple storage pools 214 in different zones, and thus objects received from users may have multiple object replicas stored in storage pools in different zones simply by associating those objects with the partitions.

As mentioned above, another problem relates to the rebalancing of object replicas stored in the file storage system due to changing membership (i.e., adding or subtracting storage servers or storage pools from the file storage system.) Such methods have been found to require the moving of multiple object replicas of the same object in response to a membership change, which is undesirable.

In one embodiment, the mapping of partitions to multiple storage pools in different zones in the file storage system 100 described above solves these problems. The use of the constrained mapping function to ensure that each partition is mapped to storage pools in different zones ensures that object replicas for the same object are never located in storage pools 214 that are in the same zone (i.e., because any given object received from a user is stored in a partition that is replicated in storage pools that are in different zones.) For example, with each storage server 108 defined as a separate zone, the addition or subtraction of a given storage server 108 from the file storage system 100 thus can only effect one partition replica, and hence one object replica of a given object (i.e., because only one of the partition replica will ever be located on a storage server that is defined as a separate zone.) In similar fashion, the rebalancing associated with changing the zone membership can be accomplished without affecting more than one replica because each zone is guaranteed to only contain one replica of a given partition.

Figure 6:
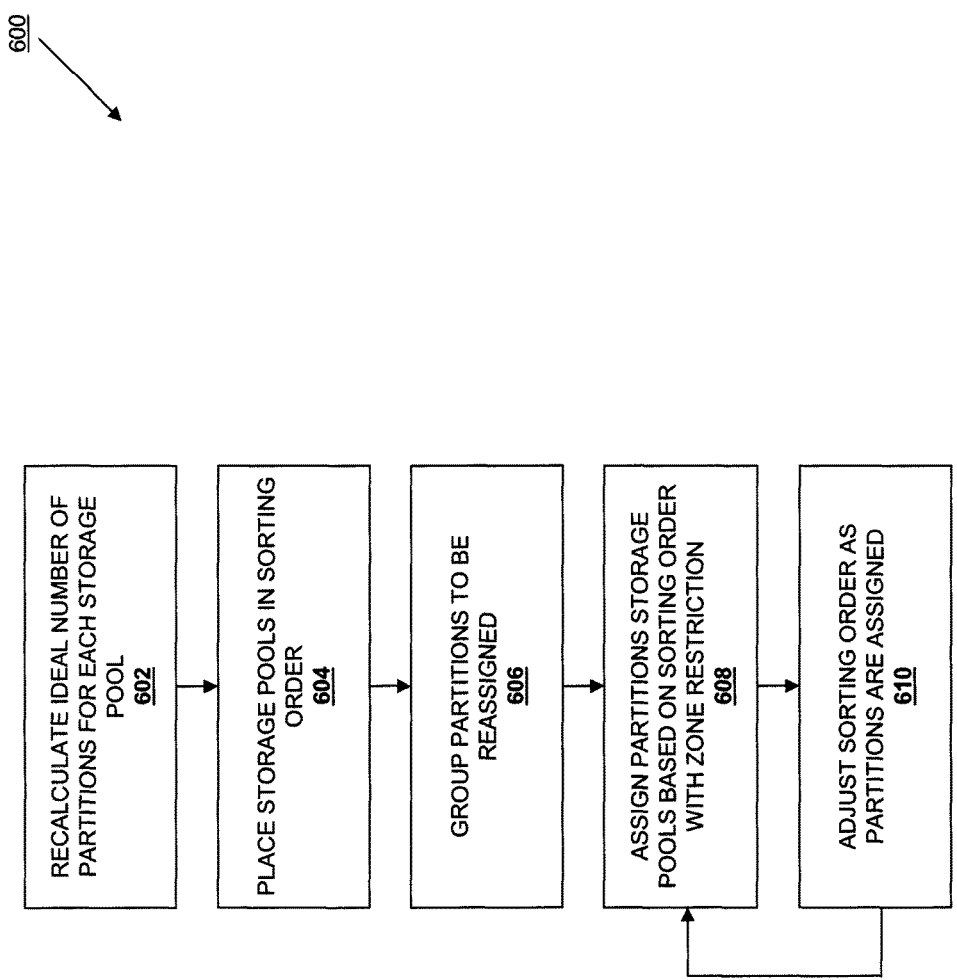
FIG. 6 is a method for reassigning partitions in response to the removal of a storage pool according to one embodiment.

Periodically, partitions may need to be reassigned to different storage pools 214, and the reassignment of partitions will result in the building of a new ring from an old ring. Such an event may occur due to the removal and/or addition of a storage pool 214 from the file storage system 100 (e.g., a membership change.) Referring now to FIG. 6, a method 600 for reassigning partitions in response to the removal of a storage pool is illustrated. The method 600 begins at block 602 where the ideal number of partitions for each storage pool is recalculated. In one embodiment, the ideal partition count for the storage pools 214 remaining in the file storage system 100 (subsequent to the removal of a storage pool) is recalculated. The method 600 then proceeds to block 604 where the storage pools are placed in a sorting order as described above with reference to block 504 of the method 500. The method then proceeds to block 606 where partitions to be reassigned are grouped. In one embodiment, a partition list for the partitions to be reassigned is created. For example, any storage pools 214 that have been removed from the file system 100 may have all their assigned partitions unassigned and added to the partition list, and any storage pools 214 that have more partitions than their ideal partition count may have random partitions unassigned from them and added to the partition list (i.e., such that those storage pools have a number of partitions that is within a predetermined amount of their ideal partition count.) The partitions on the partition list may then be reassigned to the storage pool 214 in blocks 608 and 610 of the method 600 substantially as discussed above with reference to blocks 506 and 508 of the method 500. In one embodiment, at block 608 of the method 600, whenever a partition is reassigned to a storage pool 214, the time of the reassignment is recorded. Reassignment times may be used when gathering partitions to reassign to storage pools 214, such that no partition replica for a given partition is moved twice in a predetermined amount of time. However, such reassignment restrictions based on reassignment times may be ignored for partition replicas on storage pools 214 that have been removed from the file storage system 100, as removing a storage pool 214 only happens upon storage pool 214/storage server 108 failure and thus requires the reassignment of the partitions.

In one embodiment, the method 600 is conducted periodically to help balance the amount of data stored by storage pools 214 in the file storage system 100. For example, the partition reassignment method 600 discussed above may repeated until each storage pool 214 is within a predetermined threshold of a predetermined storage capacity (e.g., within 1% of 60% storage capacity for that storage pool) or when it is determined that partition reassignment will not improve the balance of data stored by the file storage system 100 by more than a predetermined amount. For example, if a first storage server 108 includes 2 TB of storage, a second storage server 108 includes 4 TB of storage, and a third storage server 108 includes 6 TB of storage, data balancing may be conducted to ensure that each of the storage servers 108 holds the same percentage of its storage capacity (i.e., the first storage server 108 holds 0.66 TB of data, the second storage server 108 holds 1.33 TB of data, and the third storage server 108 holds 2 TB of data such that each of the storage servers 108 is at 33% of its storage capacity.) Weights may be applied to storage servers 108 to balance the distribution of data on the storage servers 108 in the file storage system 100 to account for different storage capacities.

Object Service 208

As discussed above, the object service 208 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 (e.g., a file storage module, file retrieval module, file deletion module, file encryption module) and/or the storage servers 108. The object service 208 may include instructions that, when executed by a processor, provide object storage and objection manipulation functionality such that the object service 208 is operable to, for example, store, retrieve and delete stored objects in the storage pools 214. In one embodiment, an object service 208 is provided for each storage pool that holds object data. For example, an object service 208 may be included on a server that further includes one or more storage drives that provide a storage pool for objects. In one embodiment, the objects are stored as binary files with metadata stored as extended attributes of the file in the file system used by the object storage service. In such an embodiment, the object service 208 will uses the extended attributes of the filesystem to manage the metadata. In a second embodiment, the metadata is stored in a machine-readable format next to the data itself. For example, the metadata for a file is stored in a text file or single file database.

In one embodiment, objects are stored by the object service 208 using a path derived by applying a hash function to the name of the object along with a timestamp. For example, an incoming object for a user account to be written to a container will have a hash applied to its account/container/object name and the path generated for the object is:

/objects/<partition>/<storage pool location>/objectname_hash.15673.data where "objects" indicate that the object data is stored in an object storage pool 214, <partition> is the partition identification that maps the object to a partition, <storage pool location> is the storage pool location that maps the partition replica to a storage pool 214 in a different zone than its related partition replicas, objectname_hash is the hash of the account/container/object name, and 15672 is the timestamp.

When there is a request for an object, the file storage system 100 will find all the object replicas in the file storage system 100 that include the objectname_hash and return the object data that has the most recent timestamp value. Special care is needed to record updates that should be persisted as the new canonical value. For example, when an object replica is deleted, a modification sentinel (e.g., a 0 byte "tombstone" file or ".ts" file) is written to the storage pool 214 where the deleted object replica was located and that includes the same objectname_hash as the deleted object replica (i.e., /objectname_hash.15784.ts,) and that tombstone file stays in the file storage system 100 for a predetermined amount of time (e.g., 7 days.) During object replication, discussed in further detail below, when the file storage system 100 encounters a tombstone file, the file storage system 100 checks whether the tombstone file has been in the system for 7 days. If not, the file storage system 100 searches for and deletes any object replicas that it finds related to that tombstone file (e.g., replicas that same objectname_hash as the tombstone file) to ensure that objects that were meant to be deleted from the file storage system 100 are removed and older versions of object replicas of a given object do not appear in the file storage system 100 due to, for example, the temporary failure of a storage server 108 or storage pool 214 that might have prevented the deletion of that object replica previously. If the file storage system 100 determines that a tombstone file has been in the file storage system 100 for longer than the predetermined time, that tombstone file is deleted.

The mechanism used for recording file deletion is also used to record other types of updates. For example, a "purge" marker indicates that the system should overwrite all copies of the object and set the space to free; a "version" marker indicates that the system should create a copy and mark the copy with a version number; and a "ttl" (time-to-live) marker indicates that the system should check an authoritative source for updates after the expiry of a set time period. Other types of out-of-band changes to the file are also contemplated.

Replicators

Replicators are implemented in a tailored electrical circuit or as software instructions to be used in conjunction with a processor to create a hardware-software combination that implements the specific functionality described herein. To the extent that one embodiment includes computer-executable instructions, those instructions may be implemented as an software that is stored on a computer-readable medium located in the storage management server 106 and/or the storage servers 108, and may include instructions that, when executed by a processor, keep the file storage system 100 in a consistent state in the face of temporary error conditions like network outages, storage pool 214 failure, and/or storage server 108 failure. For example, an object replicator may be provided for each storage pool 214 (e.g., a storage server 108 that provides a storage pool) that holds object data. The replicators compare stored entities in their storage pool 214 with each replica of that stored entity in other storage pools 214 in the file storage system 100 to ensure that all related replicas contain the latest version of the stored entity. In one embodiment, object replicators may use a hash list to quickly compare subsections of partitions, while container replicators and account replicators may use a combination of hashes and shared storage account metadata. In one embodiment, replicator updates of stored entities are push based. For example, replicators may compare the replica stored entities in their storage pools 214 with related replica stored entities in other storage pools in the file storage system 100, and if the replicator determines there is a difference between the replicas (e.g., by applying an order independent check sum to the related replicas), the replicator may then push the data that related replica stored entities in other storage pools need in order to be up to date. In one embodiment, the pushed updates include rsyncing replicas to efficiently provide only the data needed by the out-of-date replica. Account and container replicators may either push missing data over HTTP or rsync whole database files in the event it is determined that a push update will be inefficient. The push-based updates discussed above results in replicas being updated generally only from "local" storage pools 214 to "remote" storage pools 214. In one embodiment, this provides a benefit as data in a storage pool 214 may not belong there (as in the case of handoffs and ring changes), and a replicator can't know what data exists elsewhere in the file storage system 100 that it should pull in. Thus, it's the duty of any replicator associated with a given a storage pool 214 that contains data to ensure that data gets to other storage pools where it belongs. As discussed above, replicators may also ensure that data is removed from the system by creating the tombstone files as the latest version of a replica when that replica is deleted, and then search out and removing all replicas related to that tombstone file from the file storage system 100.

Database Replicators

Database replicators are a type of replicator, discussed above, that operate on storage pools 214 that contain accounts or containers (i.e., there may be account replicators and container replicators.) To perform the replication discussed above, the first step that a database replicator may perform may be a low-cost hash comparison to find out whether or not two replicas (e.g., a replica on the database replicators local storage pool 214 and a related replica on a "remote" storage pool 214) already match. Under normal operation, the hash comparison allows relatively quick verification that databases in the file storage system 100 are already synchronized. If the hashes differ, the database replicator may bring the databases in sync by sharing records added since the most recent previous sync point. This most recent previous sync point notes the last record at which two databases were known to be in sync. After all new records have been pushed to the remote database, the sync table (which lists which remote databases a local database is in sync with) of the local database is pushed to the remote database, so the remote database knows it's now in sync with database that the local database has previously synchronized with. If a database replica (e.g., an account replica or container replica) is found to be missing entirely from a storage pool 214 that it should exist in, the entire local database file may be recreated on that storage pool 214 using rsync techniques known in the art. In one embodiment, when an entire local database file is be recreated on a storage pool 214 using rsync, that database may be vested with a new unique id.

Object Replicator

Object replicators are a type of replicator, discussed above, that operate on storage pools 214 that contain objects. In one embodiment, object replicators associated with a storage pool 214 may used techniques known in the art, such as those used with the rsync algorithm, on remote storage pools to determine appropriate data to push data to remote storage pools. However, as object replication times may increase using this method when the file storage system 100 gets sufficiently large, a hash of the contents for each suffix directory may instead be saved to a per-partition hashes file, and the hash for a given suffix directory is then invalidated when the contents of that suffix directory are modified. The object replicator may then read these hash files, calculate any invalidated hashes, and transmit the hashes to each remote storage pool 214 that should hold the partition, and only suffix directories with differing hashes on the remote server are then rsynced. After pushing data to the remote storage pools 214, each rsynced suffix directory has its hashes recalculated. Object replicator performance is generally bound by the number of uncached directories it has to traverse, usually as a result of invalidated suffix directory hashes. In one embodiment, the file storage system 100 is designed so that around 2% of the hash space on a normal storage pool 214 will be invalidated per day.

Updaters

Updaters are implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108, and may include instructions that, when executed by a processor, process updates that may have failed. An updater may be provided with each storage pool (e.g., on a server that includes the storage pool) to process failed updates. For example, there may be times when container or account data will not be immediately updated. Such incidents may occur during failure scenarios or periods of high load. If an update of a stored entity fails, the update is queued in a storage pool 214 on the file storage system 100, and the updater that is associated with that storage pool 214 will process the failed updates. In such situations, a consistency window is used. For example, suppose the container service 210 is under load and a new object is put in to the file storage system 100. The object will be immediately available for reads as soon as the proxy 204 responds to the user 202 that the object has been successfully added to the file storage system 100. However, due to the heavy load, a container service 210 may not have been able to update its object listing, and so that update would be queued for a later update. Container listings, therefore, may not immediately contain the object, although the object has been saved and replicated within the applicable object storage pool area. In one embodiment, the consistency window needs only to be as large as the frequency at which the updater runs.

Auditors

Auditors are implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108, and may include instructions that, when executed by a processor, check the integrity of the objects, containers, and accounts stored in the storage pools 214. If corruption is found (in the case of bit rot, for example), auditors may quarantine the file, and then replication (discussed above) is used to replace the bad file from another replica. If other errors are found they may be logged (for example, an object's listing can't be found on any container storage that it should be on).

Self-Destructing Files

As an extension to the container and object storage services, another implementation provides an automatic file deletion and destruction service. The automatic file deletion and destruction service could work on either at the object level in conjunction with the object service 208, or at the container level, in conjunction with the container service 210. In either embodiment, the result would be files or containers that are destroyed when a trigger event occurs, where the most common triggering event is the passage of a specified amount of time.

The automatic file deletion and destruction service is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108. The automatic file deletion and destruction service may include instructions that, when executed by a processor, provide automatic file deletion and destruction storage and automatic file deletion and destruction manipulation functionality such that the automatic file deletion and destruction service is operable to store, retrieve and delete stored automatic file deletion and destructions in the storage pools 214. In one embodiment, an automatic file deletion and destruction service is provided for each storage pool that holds automatic file deletion and destruction data. For example, the automatic file deletion and destruction service may be included on the same server that further includes the accompanying object service 208 or container service 210, including any storage drives associated with those services.

Automatic file deletion and destruction is associated with more than simple deletion. As discussed above, object deletion in a distributed system can be subject to delays and race conditions because of the counter-requirements of high availability and replication. Accordingly, the automatic file deletion and destruction service requires higher levels of certainty about the destruction of all copies of a file than a simple deletion service.

Multiple embodiments of the automatic file deletion and destruction service are possible. As described above, the location of each replica of a particular object, or container with associated objects is known via the ring. One embodiment uses a secure overwrite protocol, wherein each replica is locked, simultaneously deleted, and then overwritten one or more times with zeroes, ones, or random bits. In this embodiment, the implementation would issue a call that would not return until each replica had been successfully deleted and overridden. This brute-force approach may take a longer period of time and could be subject to race conditions or uncertainty due to the distributed nature of the storage system.

A second embodiment uses encrypted files. In this embodiment, each object would be encrypted and the key kept in a separate file. One implementation uses secure key files for this purpose. A second implementation uses a file manifest, such as the manifest used for large file support, as the secure key file. The secure key file contains or would have its binary representation as the key needed to decrypt the object file. In this embodiment of the automatic file deletion service, the secure key file would be deleted, modified, or replaced with regular tombstone file. In this way, the encrypted contents of the encrypted object file would be first destroyed (by rendering them unintelligible), and then deleted in the ordinary fashion.

Alternative implementations of the secure key file are possible. In a first preferred embodiment, the secure key file includes a hash, known only to the object storage provider, that is based upon both a user-provided encrypted value. The encrypted object file has two levels of encryption. The inner file is encrypted using a first cipher, with the key only known to the end user. The encrypted file would then be wrapped in a second layer of encryption using the second cipher with the provider-known key. In this case, a disruption of either the end user or the storage provider renders the encrypted object file unintelligible.

In a second embodiment, the secure key file includes a hash based upon both a user-provided value as well as an outside value, such as the time. By making the key dependent both on user input as well as a variable outside the control of the user, the key file can act as a dead man's switch, requiring periodic renewal in order to maintain the decryptability of the encrypted object file. One method of performing this time-based encryption would be by using a dual key system. The first key stays in the control of the end user. The second key is used to hash a representation of the allowed time period, which hash is then be used as the second key. The time period and the encryption and hashing keys are only known to the user. In some circumstances, the value of the time is asserted by a third party, such as a well-known time server. The authenticity of the third party asserting the time can also be cryptographically verified.

In a third embodiment, the secure key file is based on a chained encryption method, wherein the value of subsequent keys is dependent on the values of the previous keys in the chain.

In a fourth embodiment, the "key file" is not a file, but instead is dependent on a record in a storage system, such as a database or distributed hash table. Multiple layers of encryption and indirection are used to achieve a balance between availability and privacy.

For any of the preceding embodiments, an alternative implementation uses extended file attributes on the file itself or on another file to store the decryption information instead of a separate manifest file. In this case the extended attribute would be overwritten, deleted, or reset. Multiple extended attributes can be used to store chained or complimentary encryption keys, tying the storage of the encryption key to the layout of the encrypted object within the filesystem.

Another embodiment may use both the destruction of the encryption key in combination with a brute-force overwrite.

One advantage of some of these embodiments is that any embodiment in which decryption relies on one or more keys can effect an immediate "destruction" of the file by securely deleting the key and scheduling a regular file deletion.

Figure 7:
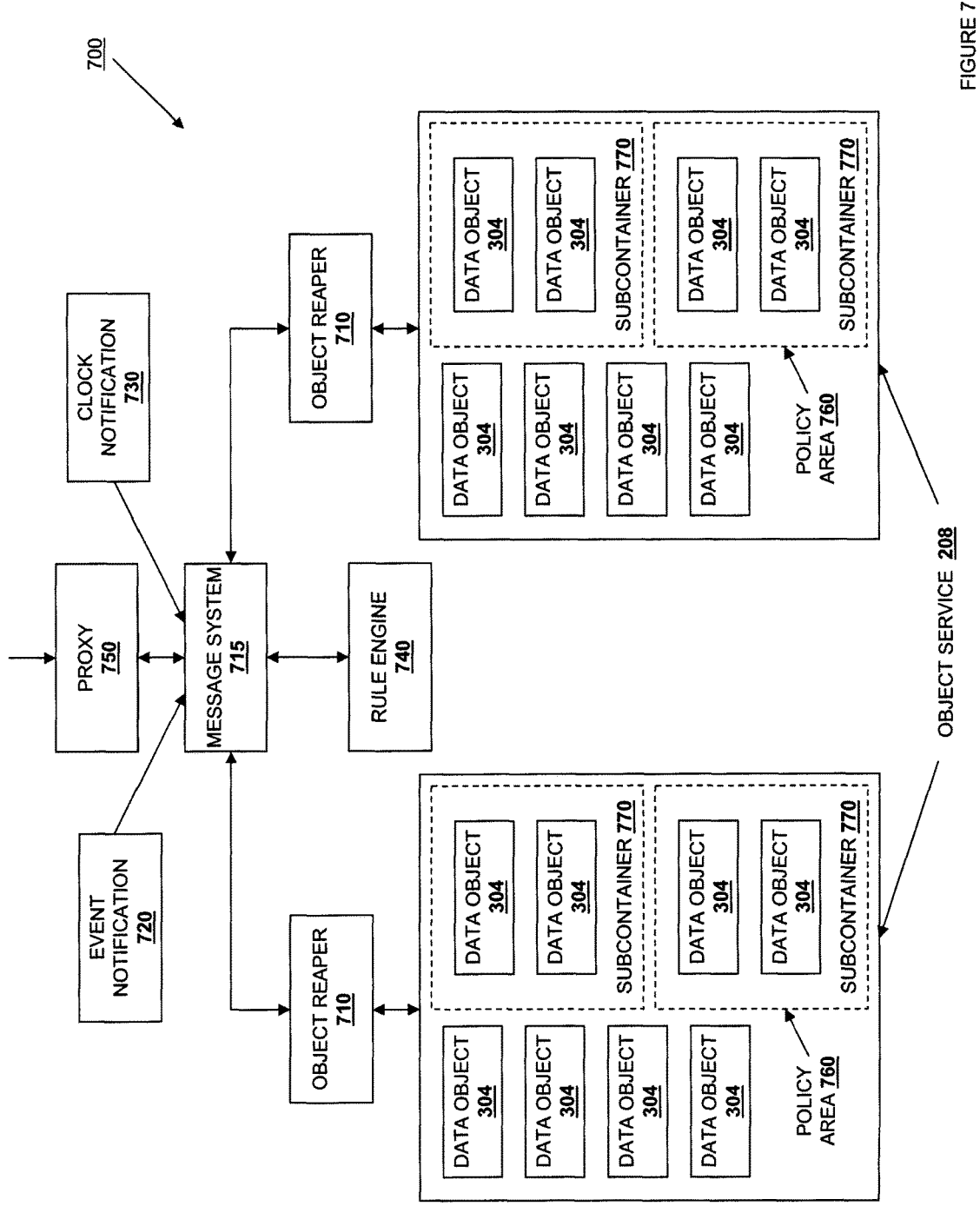
FIG. 7 is a diagram showing the implementation of an automatic deletion service according to one embodiment.

Turning now to FIG. 7, a system for managing and performing auto-deletes is shown at 700. While in one implementation the normal deletion mechanism may be used, it is frequently useful to have a subsystem dedicated to this functionality. The automatic deletion system and individual actors within it are implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium located in the storage management server 106 and/or the storage servers 108, and may include instructions that, when executed by a processor, find the deletion status of the objects, containers, and accounts registered with the automatic deletion service 700 and perform a secure delete as described herein.

In one embodiment, an automatic deletion service 700 includes one or more object reapers 710 for each storage pool that holds data objects 304. The object reapers 710 are connected to an event notification system 720 and a clock notification system 730. The event notification system 720 and clock 730 communicate the time and events representing changes in account or object status to the object reapers 710. The object reapers 710 then evaluate the event and time notifications provided by the event notification system 720 and clock notification system 730 using rule engine 740 to determine whether one or more objects needs to be deleted.

Depending on the implementation, the communication between the object reapers 710 and the event notification system 720 and clock notification system 730 may be synchronous, asynchronous, unidirectional or bidirectional. For example, in one embodiment the clock notification system 730 is implemented by or in a manner similar to the "cron" or "anacron" programs, where an object reaper 710 is awakened at a particular time or on a particular schedule to take action. In a second embodiment, the event notification system is implemented using a set of stored triggers in a database service, such as a relational database or LDAP database. These triggers wake an object reaper 710 when a change has been made.

In a third embodiment, a message service 715 sits between the components of the automatic deletion service 700 and allows them to communicate in a loosely coupled fashion. This can be accomplished using Remote Procedure Calls (RPC hereinafter) to communicate between components, built atop either direct messages and/or an underlying publish/subscribe infrastructure. In a typical embodiment, it is expected that both direct and topic-based exchanges are used. This allows for decoupling of the components, full asynchronous communications, and transparent balancing between equivalent components. In some embodiments, calls between different APIs can be supported over the distributed system by providing an adapter class which take cares of marshalling and unmarshalling of messages into function calls. In this embodiment, the message service sends a message to one or more object reapers 710 when an event occurs; the object reaper uses rule engine 740 to determine what action, if any, to take. Various other services can send messages to the object reapers 710 by sending them to the message service 715 with appropriate routing information.

Note that the above embodiments have been described relative to an embodiment in which the object reapers 710 are called or invoked by other components of the system. In another embodiment, one or more object reapers 710 instead remains active and polls other parts of the system proactively to determine whether objects need to be deleted. A second similarity of the above embodiments is that the object reapers 710 are described as evaluating the incoming events via rule engine 740. In another embodiment, the rule engine 740 is separate from the object reapers 710 and instead directs (or responds to) the object reapers 710 with information describing which objects need secure deletion. In this embodiment, the object reapers can be "dumb" and the rule engine can direct and coordinate the use of multiple account reapers 710 simultaneously.

Those of skill in the art will note that there is a distinction between denying access to a file, making it appear "deleted" from the perspective of an exterior user, and actually deleting the file. Various embodiments and implementations above describe methods and components to be used in actually deleting an object file. In a further embodiment, one or more of the methods or components used for automatic file deletion further include the ability to automatically deny access to a file as soon as the automatic deletion criteria are met, making the 'deletion' instantaneous from the perspective of the outside user.

In one embodiment of this access denial function, the automatic deletion service 700 further includes request proxy 750, which gates any requests coming in for object access. If the object has met its deletion criteria, then the request proxy 750 returns the response with an error indicating that there is no such file. In an implementation using HTTP as the transport for object access requests, the proxy returning a denied request would return a 404 HTTP status code immediately instead of passing the request on to the object storage service for fulfillment. Checking whether a particular file was deleted can be done easily and memory-efficiently by using a bloom filter, double bloom filter, bitmask, or other set membership function. For example one implementation using a single bloom filter registers deleted objects with the bloom filter, followed by a second set membership function used when the bloom filter succeeds, to guard against false positives. A second implementation using a double bloom filter uses one filter with "deleted" objects only and one filter with "pass-through" objects only. Querying both filters simultaneously uses the false positives of the first filter to double-check the second, and vice-versa. A third implementation uses a bitmask where the set bits correspond to the objects that are to be deleted; a binary AND with the bit corresponding to the object requested indicates whether the object access should be denied or passed through. A third implementation uses a set or dictionary to look up the object according to a key.

In a second implementation of this access denial function, the automatic deletion service 700 further includes a number of subsidiary containers 770 in a policy area 760 that have similar deletion characteristics. The information used to access this subsidiary container is associated with the object. While files could be grouped for common deletion for any reason, the most common reason for common deletion is time, i.e., a number of objects all are set to expire (and be auto-deleted) the same day. This embodiment will discuss deletion groups in the context of time, but any other common policy can also be treated the same way. For example, secure records could be deleted when a project is finished, when a processing run is completed, when they are to move to a different storage medium, or when a security policy dictates.

In one embodiment, objects stored by the object service 208 that are scheduled to be deleted at a particular time (or based on other criteria) are stored in policy area 760. In this embodiment, a zero-length placeholder object is placed in the object storage system using the typical naming and routing scheme described above. An "object_path" attribute is associated with the placeholder, for example by using an extended attribute, that describes the path to a hidden partition where the object is actually stored on disk. For ease of implementation, the hidden partition is named according to the deletion timestamp, for example:

/objects/<partition>/<storage pool location>/policy/delete-1332964480/objectname_hash where "objects" indicate that the object data is stored in an object storage pool 214, <partition> is the partition identification that maps the object to a partition, <storage pool location> is the storage pool location that maps the partition replica to a storage pool, the "policy" directory indicates a policy-based grouping, the "delete-1332964480" indicates the policy objective (deletion) and the time when it will be effective, and objectname_hash is the hash of the account/container/object name for location of the correct object. It is expected that the existence of the policy grouping containers will be hidden in most interactions with the system.

When there is a request for an object, the request goes through a single indirection to retrieve the actual file. The placeholder file is consulted for the location of the data file (and in embodiments that store encryption information for the file, possibly encryption keys) and the object is retrieved, decrypted if necessary, and returned. When an object is queued for deletion, the access information can be removed from the placeholder object, leading to an immediate denial of availability for the restricted file, even if the object has not yet been eradicated from disk. In an embodiment using both encryption and policy indirection, resetting (or destroying) the attributes on the placeholder file is enough to render the file both inaccessible to external users and scrambled—thus practically unavailable—to internal users.

Those of skill in the art will note that the use of policy containers can in some embodiments ease the implementation of the object reapers 710, by allowing them to focus on only the applicable policy containers and not perform a full scan of the object storage.

Those of skill in the art will note that where the encryption depends upon an outside factor, such as time, various mechanisms can be used as a dead man's switch to periodically reauthorize the file. These include distributed networks and periodic reauthorization after automated prompting.

Self-Deleting Files API

In one embodiment, the APIs for Ring, Account, Container, and other services are defined in terms of REST calls, typically executed over HTTP. These have the general structure:

METHOD /v1/<account>HTTP/1.1 although subsidiary calls may be useful to address particular parts of the object storage namespace, such as:

METHOD /v1/<account>/<container>HTTP/1.1 for container API calls. In one embodiment, these calls are extended to make the secure deletion service accessible to an API user.

In one embodiment, GET operations against the X-Storage-Url for an account can be extended with an additional arguments, such as "flags" or "policy" that provide visibility into the policies that apply to the containers associated with a particular account, including secure deletion metadata. In one embodiment, secure deletion information is shown when using a flags=all or flags=policy argument. For example, a container list request using this argument would be formatted as:

```
GET /<api version>/<account>?flags=policy HTTP/1.1
Host: storage.example.com
Content-Length: 0
X-Storage-Token: 182f9c0af0e828cfe3281767d29d19f4
```

In this example, a list of containers is returned in the response body, one container per line, followed by any applicable flags or policies in a comma-separated list. A 204 (No Content) HTTP return code is passed back if the account has no containers. For example:

```
HTTP/1.1 200 Ok
Date: Thu, 07 Jun 2010 18:57:07 GMT
Server: Apache
Content-Type: text/plain; charset=UTF-8
Content-Length: 32
images
movies
documents
backups
secure,policy=secure_delete,policy=auto_delete
```

If a format=xml or format=json argument is appended to the storage account URL, the service will serve extended container information serialized in the chosen format. The sample responses below are formatted for readability. For a JSON response:

```
GET /<api version>/<account>?flags=policy&format=json HTTP/1.1
Host: storage.example.com
Content-Length: 0
X-Storage-Token: 182f9c0af0e828cfe3281767d29d19f4
```

The server response is:

```
HTTP/1.1 200 OK
Date: Tue, 25 Nov 2008 19:39:13 GMT
Server: Apache
Content-Type: application/json; charset=utf-8
[
    {"name":"test_container_1", "count":2, "bytes":78},
    {"name":"test_container_2", "count":1, "bytes":17, "policy":
["secure_delete", "auto_delete"]}
]
```

If an XML response is specified, the server response is:

```
HTTP/1.1 200 OK
    Date: Tue, 25 Nov 2008 19:42:35 GMT
    Server: Apache
    Content-Type: application/xml; charset=utf-8
    <?xml version="1.0" encoding="UTF-8"?>
    <account name="AccountName">
        <container>
            <name>test_container_1</name>
            <count>2</count>
            <bytes>78</bytes>
        </container>
        <container>
            <name>test_container_2</name>
            <count>1</count>
            <bytes>17</bytes>
            <policy>secure_delete</policy>
            <policy>auto_delete</policy>
        </container>
    </account>
```

In one embodiment, REST operations can be performed on containers. All operations are valid HTTP request methods as described above. In addition to any other parameter accepted by and API, general metadata flags and storage policies can be retrieved or set via query parameters, including:

a. policy: Given a string value x, retrieve all matching policies. Wildcards, tokens, or special group names to select particular sets of policies.
b. flag: Given a string value x, retrieve all matching policies. Wildcards, tokens, or special group names to select particular sets of policies An example list objects request is as follows:

```
GET /<api version>/<account>/<container>[?param=value] HTTP/1.1
Host: storage.example.com
X-Auth-Token: eaaafd18-0fed-4b3a-81b4-663c99ec1cbb
```

In one embodiment, a list of objects is returned in the response body, one object name per line. If a policy or flag argument has been provided, then additional information about the object is provided as a comma-separated list after the object name. A 204 (No Content) HTTP return code is passed back if the container is empty or does not exist for the specified account. If an incorrect account is specified, the HTTP return code will be 404 (Not Found). The following are exemplary responses. For a response with "flags=*" provided as an argument and with no format specified:

```
HTTP/1.1 200 Ok
Date: Thu, 07 Jun 2010 18:50:19 GMT
Server: Apache
Content-Type: text/plain; charset=UTF-8
Content-Length: 171
diagram.jpg,flag=reduced_replication
business_plan.pdf,flag=secure_delete
phone_list.doc
If a format=xml or format=json argument is appended to the storage
account URL, the service will serve extended object information serialized
in the chosen format in the same manner shown above.. Other than the
?format=xml|json parameter, it will return the same status/errors codes.
```

In though illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

The invention claimed is:

1. A method for performing automatic deletion of object data in a cloud storage system, the method comprising:

storing a plurality of objects in a cloud storage system in a plurality of user-addressable partitions, each object being associated with a unique object identifier;

retrieving a deletion policy, wherein the deletion policy specifies a set of conditions under which an object indicated by the deletion policy should be deleted without further intervention;

associating the deletion policy with a subset of objects selected from the plurality of objects stored in the cloud storage system, the subset of objects being stored with the plurality of user-addressable partition, each partition also including objects not in the subset of objects associated with the deletion policy;

for each object associated with the deletion policy, storing the object in a not user-addressable hidden partition and storing a related placeholder object in the user-addressable partition, wherein access information for the object in the not user-addressable hidden partition is included in the related placeholder object;

determining that occurrence of one or more events triggers a set of conditions specified by the deletion policy; and denying user access to the objects associated with the deletion policy by removing access information to the objects in the related placeholder objects.

2. The method of claim 1, wherein the access information included in the related placeholder object is a redirection attribute that is not user-accessible; and wherein user access to the stored object is performed using the redirection attribute as a key to locate and retrieve the stored object from the hidden partition.

3. The method of claim 2, wherein changing the access information of the partition on the placeholder object includes a step of removing or modifying the redirection attribute on the related placeholder object.

4. The method of claim 2, wherein further comprising:

before placing an object associated with the deletion policy in the hidden partition, encrypting the object using a first key; and placing a first decryption key attribute on the placeholder object;

wherein the first decryption key attribute is not user-accessible; and wherein user access to the stored object is further performed using the first decryption key attribute as a key to decrypt the encrypted stored object retrieved from the hidden partition.

5. The method of claim 4, wherein, prior to encrypting the stored object using the first key, the object is encrypted using a user-known second key.

6. The method of claim 4, wherein denying user access to an object associated with the deletion policy by modifying the related placeholder object includes a step of removing or modifying the first decryption key attribute on the related placeholder object.

7. The method of claim 1, further comprising:

receiving a request to store a new object associated with the deletion policy:

storing the related placeholder in a user-accessible partition; and storing the new object in the hidden partition without ever storing the new object in the user-accessible partition.

8. A method for performing automatic deletion of object data in a cloud storage system, the method comprising:

defining a storage policy, the storage policy including a set of deletion conditions under which one or more objects stored in the cloud storage system should be deleted without user intervention;

associating the storage policy with a hidden partition that is not user-accessible;

creating a partition placeholder object in a user-accessible area, the user-accessible area also including partitions not associated with the storage policy;

associating one or more objects stored in a storage with the storage policy by changing their storage location to the hidden partition;

periodically evaluating the deletion conditions associated with the storage policy to determine if the deletion conditions are satisfied;

in response to determining that the deletion conditions are triggered, denying user access to the objects associated with the storage policy by removing access information to the objects in the partition placeholder object.

9. The method of claim 8, wherein the partition placeholder object includes a non-user-accessible redirection attribute.

10. The method of claim 9, wherein the step of periodically evaluating the deletion conditions associated with the storage policy performed by scanning the hidden partition associated with the storage policy.

11. The method of claim 10, wherein the step of scanning storage policy includes evaluating metadata associated with the hidden partition.

12. The method of claim 9, wherein the step of denying user access to the objects associated with the storage policy by modifying the partition placeholder from the storage is performed by removing the redirection attribute from the partition placeholder.

13. A storage system for performing an automatic object deletion service, the system comprising:

a storage management server, the storage management server including a processor, a file storage module, a file retrieval module, and a file deletion module;

one computer-readable storage coupled to the storage management server, the computer-readable storage containing a plurality of policy storage containers, wherein each policy storage container is operable to store a plurality of data files, wherein a subset of the policy storage containers are contained in an indirect-access area that is not user-addressable, and wherein a remainder of the policy storage containers are stored in a direct-access area that are user-addressable;

wherein the file storage module is configured to store a first data file in a policy storage container of the plurality of policy storage containers in the indirect-access area on the computer-readable storage;

wherein, contemporary to the storage of the first data file in the indirect-access policy storage container, the system creates a placeholder object in a direct-access area of the computer-readable storage, the placeholder object including non-user-accessible access information attributes associated with the policy storage container storing the first data file; and wherein the file deletion module is configured to:

receive a notification indicating occurrence of one or more events; and determine that the occurrence of one or more events triggers a set of conditions specified by a deletion policy associated with the indirect-access policy storage container under which data files stored and are to be deleted without further intervention; and deny requests to access the first data file stored in the indirect-access policy storage container by removing access rights to the first data file in the placeholder object.

14. The storage system of claim 13, further comprising a file encryption module configured to encrypt the first data file when it is stored in the indirect-access policy storage container, wherein the access information attributes of the policy storage container further includes a decryption key.

15. The storage system of claim 13, wherein the storage management server further includes a network interface operable to receive requests to access the stored first data file.

16. The storage system of claim 13, wherein the file deletion module is further configured to periodically examine metadata associated with the indirect-access policy storage container and conditionally remove the indirect-access policy storage container, the placeholder object, and the first data file from the computer-readable storage.

17. The storage system of claim 16, wherein the metadata associated with the indirect-access policy storage container is an automatic deletion time, and wherein the removal of the policy storage container and associated the first data file from the computer-readable storage is conditional on an occurrence of the automatic deletion time.

18. The system of claim 16, wherein the policy storage container is a first policy storage container, and wherein the file storage module is operable to store a second data file within the first policy storage container in the indirect-access area when a file deletion metadata associated with the second data file are the same as the file deletion metadata associated with the first data file, and in a second policy storage container in the indirect-access area when the file deletion metadata associated with the second data file are different from the file deletion metadata associated with the first data file.

* * * * *